United States Patent
Melnick et al.

(10) Patent No.: US 7,501,719 B2
(45) Date of Patent: Mar. 10, 2009

(54) BACKUP COMMUNITY POWER

(75) Inventors: Walter Melnick, Baton Rouge, LA (US); Jonathan B. Bruser, Baton Rouge, LA (US); Vincent Michael Corsentino, Jr., Baton Rouge, LA (US)

(73) Assignee: Community Power Group, LLC, Baton Rouge, LA (US)

( * ) Notice: Subject to any disclaimer, the term of this patent is extended or adjusted under 35 U.S.C. 154(b) by 275 days.

(21) Appl. No.: 11/402,149

(22) Filed: Apr. 11, 2006

(65) Prior Publication Data

US 2007/0236087 A1  Oct. 11, 2007

(51) Int. Cl.
*H02J 7/00* (2006.01)

(52) U.S. Cl. .......................................... 307/64

(58) Field of Classification Search ..................... 307/64
See application file for complete search history.

(56) References Cited

U.S. PATENT DOCUMENTS 6,194,794 B1 * 2/2001 Lampe et al. ................. 307/68
6,215,202 B1 * 4/2001 Luongo et al. ................ 307/64

* cited by examiner

*Primary Examiner*—Robert L. Deberadinis
(74) *Attorney, Agent, or Firm*—Roy, Kiesel, Keegan & DeNicola

(57) ABSTRACT

An improved method and apparatus for providing backup community power. The improved system is able to deliver power to a community in the event of power failure of the lines feeding it by way of a large scale generator being integrated with the existing power lines in a community and being selectively switched between power sources to maintain electrical power to a community.

7 Claims, 2 Drawing Sheets

BACKUP COMMUNITY POWER

BACKGROUND OF THE INVENTION

The present invention relates to a method and apparatus for providing backup electrical power to a community of homes.

In the traditional mode of providing electrical power to homes, power is delivered from a centralized location to neighborhoods by way of power lines. The destinations for power, such as homes and businesses, are arranged on these power lines in a "serial" fashion; that is, the power lines are run along a line that generally parallels the houses on the streets of the community. Each location taps off of the power line, which feeds each location. Thus, a multitude of homes within a community, neighborhood or even town may be dependent upon a single power line or a small group of power lines.

Obvious downsides to this current mode of power delivery exist. Since all the locations powered by the lines are fed from one location, a break in the power line, whether by felled trees, wind, blown transformers or other causes, may interrupt power from being delivered to numerous locations. This obviously results in at best, inconvenience, and at worst, may be life-threatening for those who require power for items such as respirators or heating their homes.

To combat this, several concepts have been advanced. One of these is to bury power lines in the ground as opposed to mounting them on poles where they are more exposed to the elements. This largely eliminates problems caused by wind or fallen objects, but is only as effective as far as the power lines are buried. Should, for example, a tree fall on an above ground line feeding an area with buried cables, power utility service will still be lost. The recent hurricanes that struck the U.S. Gulf Coast provide numerous examples of areas that were without power for weeks at a time, even though no damage or only minor damage may have occurred in their immediate vicinity, showing a clear need for backup power in areas that are likely (and often) without power.

Another method of dealing with loss of power is through the use of generators. Small, portable generators can be used with relative ease and are not particularly expensive to maintain, but can only power a few appliances and lights at a time, and must be used at each location without power. While better than nothing, most of these generators are for emergency use, and not suitable to have a household function normally as it would under full power. In addition, these generators require some understanding of how electricity is transmitted, yet they are often installed by persons without much appreciation or understanding of how electricity transmission lines work. Damage to electrical appliances and home electrical lines from improperly installed generators is not uncommon. House fires resulting from such damage is an all too frequent occurrence. Moreover, the wake of a natural disaster is a particularly poor time for a fire, as the demands on emergency workers will already be quite high.

Whole-house generators which are permanently installed in homes may be employed as an alternative. These larger generators overcome much of the lack of power in smaller generators, and can be setup to run automatically without much user intervention. However, these generators cost much more than portable generators, and require significant maintenance by the homeowner. Even considering the benefits, these larger generators must still be installed at each home to be powered, with all of the problems addressed above that can arise from improper installation.

With either of these generator solutions, another problem is introduced by virtue of the generator's connection to an electrical system, that of backfeeding. Backfeeding is the introduction of electrical current to power lines from a service location rather than to it. For example, if power is out to an area, and a generator is connected to a home and operating, it may be installed so that it is delivering power back to the lines that ordinarily feed it. While such installations are improper, they are unfortunately relatively common. The danger is that power company employees who are in contact with these lines may be injured or electrocuted by the power being delivered to lines that were thought to be dead. Backfeeding is one of the biggest sources of injury to utility company workers.

All of these aspects of the current state of the art lead to an increased need for a backup power system for communities meeting the following objectives.

OBJECTS OF THE INVENTION

One object of the invention is to provide backup power to communities when the main power supply fails.

Another object of this invention is to provide a more cost-effective solution for generator power in the event of power loss.

Yet another object of this invention is to allow communities to spread the cost of backup power through the entire community.

Yet another object of this invention is to provide seamless integration of generator power with existing power delivery services.

Still another object of this invention is to provide a generator solution for communities with minimal user involvement with regard to maintenance and operation.

Still another object of this invention is to provide a backup solution that prevents generator power from being backfed to power lines.

Other objects and advantages of this invention shall become apparent from the ensuing descriptions of the invention.

SUMMARY OF THE INVENTION

According to the present invention, a method and apparatus for providing backup community power is disclosed. The improved system is able to deliver power to a community in the event of power failure of the lines feeding it by way of a large scale generator being integrated with the existing power lines in a community. This generator would be able to provide members of the community with continued utility service should the power lines feeding a community be detached, disabled or otherwise unable to deliver electricity. Cost, upkeep and operation is handled centrally, and individual community members need not be troubled with same.

The present invention of backup community power is thus a much-improved method by which a large generator is employed for the benefit of a community of several homes, such that the cost of "off-grid" power generation can be apportioned among many homeowners, as well as providing seamless integration with existing power systems to minimize intrusion on homeowners from the physical, maintenance and financial aspects of generator ownership.

The present invention provides that this generator may either be a permanent fixture, or an on-demand service, wherein the generator may be transported to a location where it is required on an "as-needed" basis. In this fashion, costs can be somewhat reduced by not requiring all hardware to be present at each installation, as well as offer a safer alternative to existing temporary power solutions by preventing back-feed onto the power grid, or injury to inexperienced homeowners who would otherwise attempt to provide power through consumer-line generators.

BRIEF DESCRIPTION OF THE DRAWINGS

The accompanying drawings illustrate an embodiment of this invention. However, it is to be understood that this embodiment is intended to be neither exhaustive, nor limiting of the invention. They are but examples of some of the forms in which the invention may be practiced.

DETAILED DESCRIPTION OF EXEMPLARY EMBODIMENTS

Figure 1:
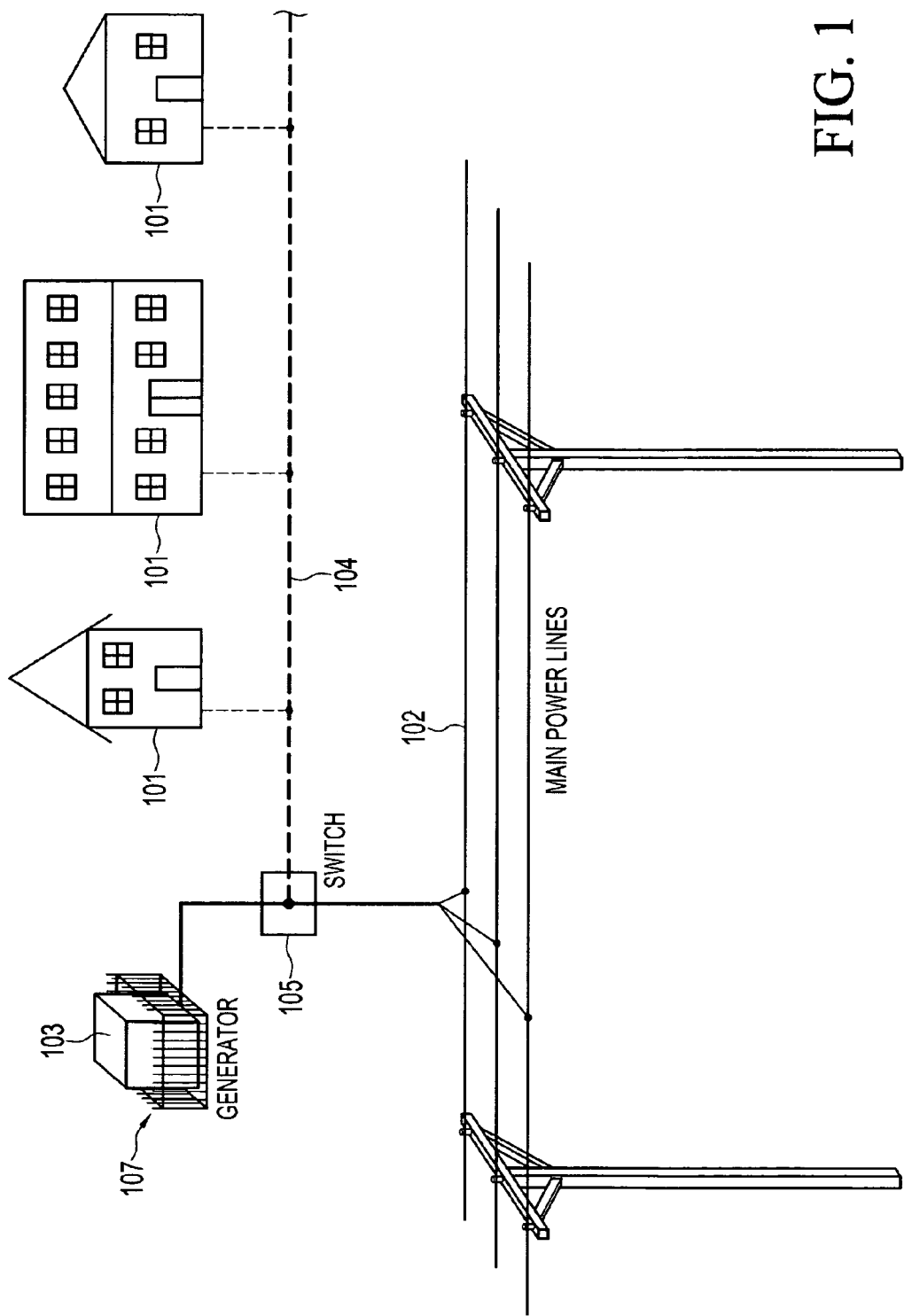
FIG. 1 is a diagram showing the arrangement of components of the invention.
Figure 2:
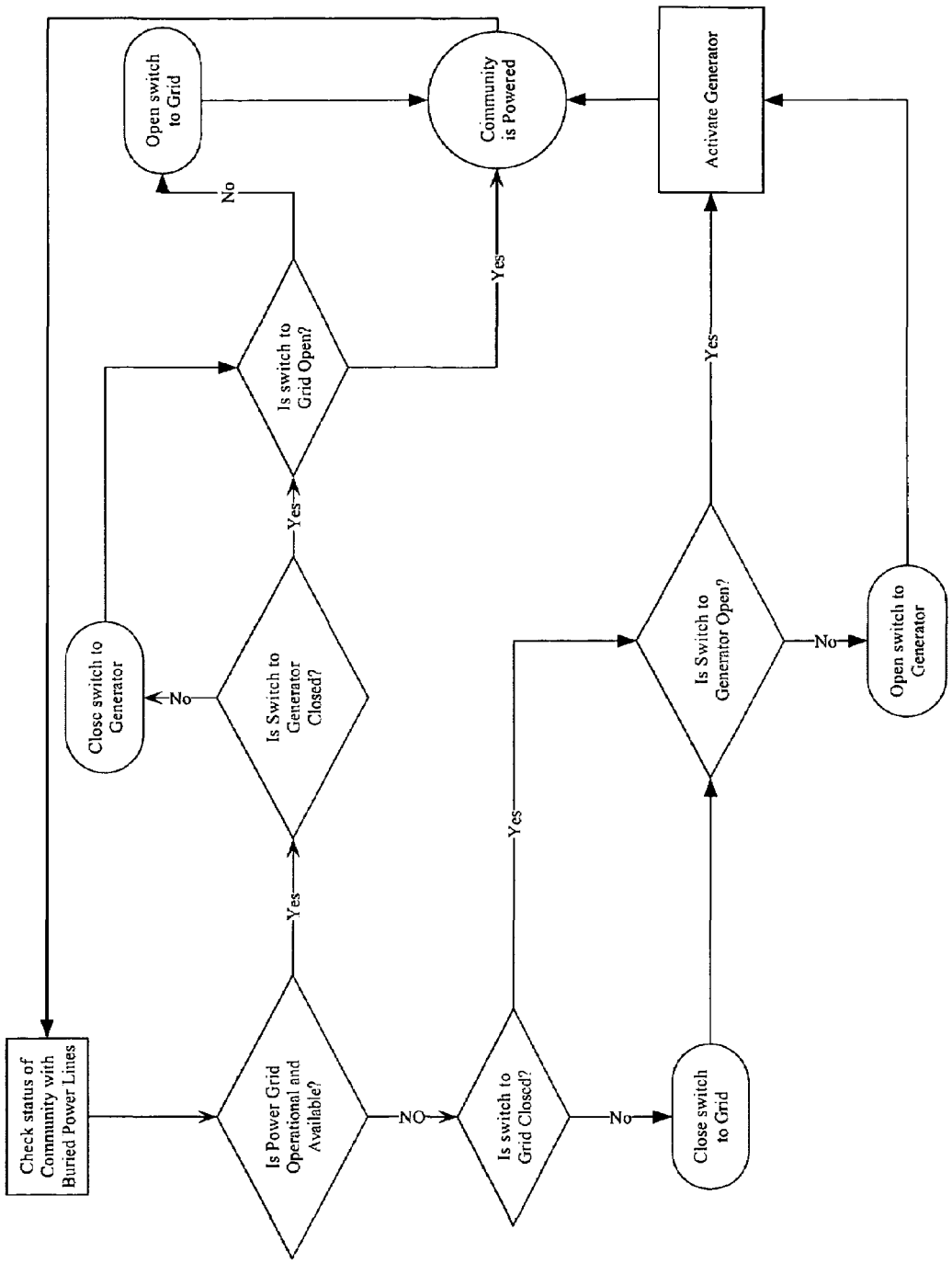
FIG. 2 is a flow chart illustrating the steps of executing the invention.

Without any intent to limit the scope of this invention, reference is made to the figures in describing the various embodiments of the invention. FIGS. 1-2 show various aspects of exemplary embodiments of the present invention.

The present invention relates to a basic system for backup community power having the basic components of community 101 sought to be powered, regional power transmission grid 102 which feeds community 101 via community power lines 104 under normal circumstances, and generator 103, provided to maintain power to community 101 in the event that the grid is unavailable to provide power to community 101.

The system will also contain switch 105 to control the flow of power from grid 102 to community 101, as well as to control the flow of power from generator 103 to community 101. Switch 105 will be configured to prevent backfeeding to grid 102, such that generator 103 and grid 102 cannot be connected. Switch 105 will preferably be an automatic transfer switch, though a manual transfer switch could be used if desired. Though switch 105 has been discussed herein as being a single switch, those skilled in the art will appreciate that switch 105 may be comprised of multiple switches or switch components.

The voltage of grid 102 at the point where it feeds community 101 and the voltage to be produced by generator 103 will be the primary characteristics to be considered when selecting switch 105. Ideally, these voltages will be equal, though this will not always be the case, as discussed in more detail below. Where these voltages do not match, switch 105 should be configured to handle the higher voltage. For example, the preferred switch 103 is an automatic transfer switch. Where generator 103 is a 13.8 kilovolt generator and the grid 102 is 34.5 kilovolts where grid 102 feeds community 101, an automatic transfer switch suitable to voltages as high as 34.5 kilovolts should be used. In all cases, switch 105 should be selected based upon the electrical requirements of the actual system being installed. Suitable switches can be obtained from the General Electric Co., and particularly their Commercial and Industrial Division at 12320 Industriplex Blvd. in Baton Rouge, La.

Community power lines 104 will have been configured to transmit electricity at a particular voltage. Transformers will be provided in this distribution system to step the voltage up or down to the level suitable for use in the homes of consumers, typically two hundred twenty or one hundred ten volts. These transformers will be configured to step up or down from a set voltage level in community power lines 104. Therefore, it is important that the electricity provided by generator 103 be delivered to community power lines 104 at the same voltage that would have been obtained from grid 102.

Ideally generator 103 will be configured to generate current at the desired voltage. Commercial generators that can produce electricity from 480 volts to 13.8 kilovolts are common. Many community transmission systems are configured to carry current at voltages within this range. When that is the case, generator 103 can simply be selected to deliver current at the appropriate voltage.

However, some community transmission systems are not configured to carry current within this range. For example, in one development of which the inventors are aware, the community power lines 104 are configured to carry electricity at 34.5 kilovolts. While it would certainly be possible to obtain a custom built generator 103 that could deliver electricity at this voltage, in most cases it will be more practical to provide a transformer between generator 103 and community power lines 104 in order to step the current produced by generator 103 up to the level community power lines 104 are designed to carry.

Transformers are selected primarily upon the voltage step they are to provide. In this instance, the transformer would need to step the voltage of generator 103 up, or down, to the voltage at which community power lines 104 are designed to operate. With this information, suitable transformers can be obtained from the General Electric Co., and particularly their Commercial and Industrial Division at 12320 Industriplex Blvd. in Baton Rouge, La.

Generator 103 may either be a fixed or portable model, depending on the desired implementation. Then, the power requirements of community 101 would be ascertained, and an appropriate capacity generator 103 would be selected. Generator 103 would then be located preferably within proximity of community 101 to facilitate ease in connection, but also to minimize the distance between the backup power source and community 101. A generator area 107 can be utilized either for a fixed or permanent generator 103 or a "parking" area for a portable generator 103 that is only installed on an "on-demand" basis. Multiple generators 103 may be provided as needed.

As a rule of thumb, one megawatt will power about seven hundred-fifty homes of moderate size. A greater capacity will be desired when larger homes are to be serviced. For a community of about one thousand relatively large homes (about 4000 square feet) the inventors anticipate using three to four 2.0 megawatt generators. In particular, the inventors anticipate being able to provide from between about two to about fifty kilowatts per hour per residence.

Fifty kilowatts per hour per residence is much more energy than will typically be required even in communities comprised of relatively large homes. However, excess generator capacity may be desired to ensure that generator 103 is capable of handling the spike that will often accompany start-up. For example, consider a community that lost power during a relatively warm afternoon when virtually all of the air-conditioning units in the community would likely be running. When generator 103 is connected to power lines 104, all of the air-conditioning motors as well as all of the refrigerator and freezer motors, fan motors, and etc. would try to restart at one time. Most such motors require an initial spike in energy at start up, so the demand at such times can be much higher than would typically be the case. Having excess capacity in generator 103 will allow the system to deal with such spikes.

Typical electrical demands for each community 101 will be available from utility company records, and the actual number and size of generators 103 required can be determined accordingly, bearing in mind that it is desirable that generators 103 be capable of producing more than the peak demand of community 101. The inventors contemplate using Caterpillar's model 3208 2.0 Megawatt generator in practice, though other suitable commercially available generators would work as well. Such Caterpillar generators may be obtained from Louisiana Machinery Co. of 3799 West Airline Hwy. in Reserve, La.

Generators 103 will preferably be diesel or natural gas powered, though generators that operate on other fuels would certainly be compatible with the invention. Fuel for generators 103 can be stored above ground or below as desired. Providing bulk fuel storage tanks onsite may facilitate operations of generators 103 in the event of a fuel shortage. Convertible generators 103 configured to operate on either diesel or natural gas could also be particularly useful, given the intended purpose of the invention.

The primary purpose of the invention is to provide power to communities when their source of electricity from grid 102 is lost. Extended power interruptions often occur in the wake of natural disasters such as hurricanes and earthquakes. However, in addition to interrupting power, such events can also interrupt fuel supplies. If generator 103 is configured to run only on diesel and diesel becomes difficult to obtain after a disaster, it might not be possible to run generators 103. However, if generator 103 were configured to run on either diesel or natural gas, the operator could simply convert generator 103 to the other fuel if one became in short supply.

An essential element of the system is that community power lines 104 are substantially buried, primarily in order to minimize the chance of disruption. Above-ground power lines are more subject to wind damage, trees and other debris causing breaks in the lines, weathering over time and other hazards that come from being constantly exposed. The central goal of the invention is to provide power to communities whose internal power distribution lines are functional, but that are without power because of a failure, or multiple failures, elsewhere on grid 102. If the community's internal power lines are significantly damaged, an on-site generator 103 will not be very useful. Therefore, the inventors do not contemplate using the present invention in communities whose internal power distribution lines are highly susceptible to storm damage. That will almost invariably exclude any community with above ground power transmission lines.

In operation, then, the method used to control the system above will be to provide community 101 electrical power from grid 102 via community power lines 104 as is typical in most areas which are "on the grid," a term used to describe those areas powered by public power lines. During period of extended unavailability of power, however, such as in the period following tropical storms, strong thunderstorms, ice storms, tornadoes, high power draws, blackouts and other extraordinary circumstances, power can be switched from grid 102 to generator 103. Switch 105 will disconnect community power lines 104 from grid 102. Next, generator 103 will be powered up until it reaches its desired operating level—typically its full operating capacity. Switch 105 will then form an electrical connection between community power lines 104 and generator 103. Once power is again available from grid 102, switch 105 can disconnect community power lines 104 from generator 103 and reconnect them to grid 102, permitting power to flow from grid 102 to community 101 via power lines 104 again, as is the case under normal circumstances. Finally, generator 103 can be deactivated.

Though these steps are laid out here in sequence, the operation can be automated through the use of various detection and other systems such that members of community 101 may never be aware that the community lost power from the grid, though there will typically be a very brief period in which power is out while generator 103 powers up and the system transitions between generator 103 and grid 102. As part of this method, the operator of the system would also provide service and operation of the system as part of the installation, which adds to the system's transparency to the community 101, whereby users of the system need not be involved in the installation, implementation or upkeep of the system.

It will be appreciated that the cost of generator 103 will be relatively high—certainly higher than most individual homeowners will be willing to pay. However, by connecting the entire community 101 to generator 103, this cost can be spread over many homeowners, making back-up power available at relatively affordable rates and simultaneously avoiding the need for individual generators and the dangers associated with such generators within community 101.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

The invention claimed is:

1. A system for providing backup power to a community electrically connected to a regional power transmission grid comprising:
   a. a community comprising a plurality of buildings to which electricity is provided via a system of community power transmission lines, substantially all of which are buried;
   b. at least one generator
   c. a switch positioned intermediately between said community power transmission lines and said grid, said switch further positioned intermediately between said community power transmission lines and said generator, wherein said switch is configured to electrically connect and disconnect said community power transmission lines and grid, and wherein said switch is further configured to electrically connect and disconnect said generator from said community power transmission lines.

2. A system for providing backup community power according to claim 1 wherein said generator is portable.

3. A system for providing backup community power according to claim 1 wherein said generator is fixed on site.

4. A system for providing backup community power according to claim 1 further comprising an on site bulk fuel storage tank operatively connected to said generator.

5. A method of providing backup power to a community electrically connected to a regional power transmission grid, wherein the community comprises a plurality of buildings to which electricity is provided via a system of community power transmission lines, substantially all of which are buried, wherein the method comprises:
   a. electrically disconnecting said community from said regional power transmission grid upon an interruption of power from said transmission grid to said community;
   b. electrically connecting said buried community power transmission lines to a generator located proximate to said community;
   c. operating said generator to provide electricity to said buildings within said community via said buried community power transmission lines; and
   d. terminating the operation of said generator and reconnecting said community to said regional power transmission grid upon restoration of a power supply from said transmission grid to said community.

6. A method of providing backup community power according to claim 5 further comprising providing service and operation of said at least one generator.

7. A method of providing backup community power according to claim 5 further comprising the step of assessing required power and basing said generator's capacity on same.

* * * * *